US012125365B2

(12) United States Patent
Srnec et al.

(10) Patent No.: US 12,125,365 B2
(45) Date of Patent: Oct. 22, 2024

(54) METHODS AND SYSTEMS FOR MONITORING A POTENTIAL HAZARD AT AN UNOCCUPIED TRANSPORT UNIT AND ISSUING A NOTIFICATION IN RESPONSE TO DETECTING THE HAZARD

(71) Applicant: THERMO KING LLC, Minneapolis, MN (US)

(72) Inventors: Matthew Srnec, Minnetonka, MN (US); Gysler Castelino, Golden Valley, MN (US)

(73) Assignee: THERMO KING LLC, Minneapolis, MN (US)

( * ) Notice: Subject to any disclaimer, the term of this patent is extended or adjusted under 35 U.S.C. 154(b) by 141 days.

(21) Appl. No.: 17/589,375

(22) Filed: Jan. 31, 2022

(65) Prior Publication Data

US 2023/0245548 A1 Aug. 3, 2023

(51) Int. Cl.
*G08B 21/00* (2006.01)
*G08B 5/22* (2006.01)
*G08B 21/22* (2006.01)

(52) U.S. Cl.
CPC ............. *G08B 21/22* (2013.01); *G08B 5/223* (2013.01)

(58) Field of Classification Search
CPC ................................ G08B 21/22; G08B 5/223
See application file for complete search history.

(56) References Cited

U.S. PATENT DOCUMENTS 3,692,100 A * 9/1972 Gallagher, Jr. ........ F25D 17/005 62/211
5,129,235 A * 7/1992 Renken ................... F25D 19/04 454/91
6,125,625 A * 10/2000 Lipinski .................... F23R 3/40 60/39.511
7,323,981 B2 * 1/2008 Peel ....................... G07C 5/008 340/572.1
8,620,832 B2 * 12/2013 Ng ..................... G06Q 10/0833 705/333

(Continued)

FOREIGN PATENT DOCUMENTS

DE 112020001248 12/2021
EP 3068016 9/2016

OTHER PUBLICATIONS

Extended European Search Report, issued in the corresponding European patent application No. 23154165.7, dated Jun. 26, 2023, 11 pages.

*Primary Examiner* — Steven Lim
*Assistant Examiner* — Son M Tang
(74) *Attorney, Agent, or Firm* — HSML P.C.

(57) ABSTRACT

A method for monitoring a potential hazard at an unoccupied transport unit and issuing a notification in response to detecting the potential hazard is provided. The method includes monitoring for the potential hazard at the unoccupied transport unit. The method also includes determining whether there is someone is in close proximity to the unoccupied transport unit upon determining the potential hazard. Also, the method includes providing a local notification of the potential hazard when it is determined that there is someone is in close proximity to the unoccupied transport unit and not providing the local notification of the potential hazard when it is determined that there is no one in close proximity to the unoccupied transport unit.

3 Claims, 7 Drawing Sheets

(56) References Cited

U.S. PATENT DOCUMENTS

| | | | | |
|---|---|---|---|---|
| 8,786,437 | B2 * | 7/2014 | Breed | G01P 15/02<br>340/568.1 |
| 9,399,150 | B1 * | 7/2016 | Almutairi | G08G 1/205 |
| 10,377,209 | B2 * | 8/2019 | Kolda | B60H 1/00428 |
| 10,889,436 | B2 * | 1/2021 | Luxford | G06Q 50/26 |
| 11,738,623 | B2 * | 8/2023 | Renken | B60H 1/3232<br>165/11.2 |
| 2002/0108507 | A1 * | 8/2002 | May | B65F 1/1638<br>700/229 |
| 2005/0057344 | A1 * | 3/2005 | Davis | G08G 1/205<br>340/425.5 |
| 2005/0258942 | A1 * | 11/2005 | Manasseh | G07C 5/008<br>340/425.5 |
| 2009/0146813 | A1 * | 6/2009 | Nuno | G08B 21/24<br>340/572.1 |
| 2013/0002443 | A1 * | 1/2013 | Breed | B65D 90/48<br>340/686.1 |
| 2013/0278067 | A1 * | 10/2013 | Poss | H02J 7/35<br>307/62 |
| 2014/0313026 | A1 | 10/2014 | Mayer | |
| 2015/0135737 | A1 * | 5/2015 | Cresswell | F25B 49/02<br>62/190 |
| 2017/0373502 | A1 * | 12/2017 | Gjerpe | H02J 3/38 |
| 2019/0299749 | A1 * | 10/2019 | Lattin | F25B 27/00 |
| 2021/0143641 | A1 * | 5/2021 | Srnec | H02J 7/0068 |
| 2022/0005210 | A1 | 1/2022 | Raveendran | |
| 2023/0252879 | A1 * | 8/2023 | Rossey | G08B 21/22<br>340/686.6 |

* cited by examiner

METHODS AND SYSTEMS FOR MONITORING A POTENTIAL HAZARD AT AN UNOCCUPIED TRANSPORT UNIT AND ISSUING A NOTIFICATION IN RESPONSE TO DETECTING THE HAZARD

FIELD

This disclosure relates generally to a transport climate control system. More specifically, this disclosure relates to methods and systems for monitoring a potential hazard at an unoccupied transport unit and issuing a notification in response to detecting the potential hazard.

BACKGROUND

A transport climate control system (TCCS) can include, for example, a transport refrigeration system (TRS) and/or a heating, ventilation and air conditioning (HVAC) system. A TRS is generally used to control an environmental condition (e.g., temperature, humidity, air quality, and the like) within a cargo space of a transport unit (e.g., a truck, a container (such as a container on a flat car, an intermodal container, etc.), a box car, a semi-tractor, a passenger vehicle such as a bus, or other similar transport unit). The TRS can maintain environmental condition(s) of the cargo space to maintain cargo (e.g., produce, frozen foods, pharmaceuticals, etc.). In some embodiments, the transport unit can include a HVAC system to control a climate within a passenger space of the vehicle.

SUMMARY

This disclosure relates generally to a transport climate control system. More specifically, this disclosure relates to methods and systems for monitoring a potential hazard at an unoccupied transport unit and issuing a notification in response to detecting the potential hazard.

In particular, the embodiments described herein can provide a notification of a potential hazard to protect people who may be approaching the unoccupied transport unit without knowledge of a potential hazard at the unoccupied transport unit. That is, the notification (as, for example, an audible/sound notification, a digital message notification, a visual indicator (e.g., light) notification, etc.) can be provided not only to a driver in a cab of an unoccupied transport unit and/or a vehicle towing the unoccupied transport unit, but also to local and remote devices.

The embodiments described herein can issue a local notification of a potential hazard when someone is in close proximity to the unoccupied transport unit. For example, in some embodiments, one or more proximity sensors are used to detect the presence of someone in close proximity to the unoccupied transport unit. This can protect people who may be approaching the unoccupied transport unit who do not have knowledge of the potential hazard. This can include random people that are approaching or in close proximity to the unoccupied transport unit and service personnel who can be notified of the potential hazard as they are approaching the unoccupied transport unit. Accordingly, the local notification can be provided only when required (i.e., someone is approaching or already in close proximity to the unoccupied transport unit). Also, by issuing a local notification only when someone is in close proximity to the unoccupied transport unit, the embodiments described herein can preserve energy of one or more power sources providing power to, for example, the transport climate control system. Energy savings can become important for, for example, stand-alone transport climate control systems which may run on limited battery supply.

In some embodiments, the unoccupied transport unit may be equipped with one or more different types of proximity detection devices using, for example, visual detection (e.g., camera), sonar, ultrasound, radar, lidar (i.e., light detection and ranging), remote-start key detection, etc. to detect the presence of an obstruction or someone in close proximity to the unoccupied transport unit. The embodiments described herein can utilize one or more of these proximity detection devices to issue a notification in case a potential hazard is present and someone is in close proximity to the unoccupied transport unit.

The notification (local or remote or a combination thereof) can be provided in one or more of an audio notification, a visual notification, a sensory notification, a digital notification, a telematics notification, etc.

The embodiments described herein can provide self-contained methods of notification and/or the ability to connect externally via one or more communication systems to one or more third party devices.

An unoccupied transport unit can be subject to different types of electric and non-electric hazards. Examples of potential electric hazards can include: a high voltage DC isolation failure where, for example, a positive or negative terminal (or both) of an ungrounded power source is in physical contact with a chassis (e.g., single or double isolation faults); a generator fault of a generator (e.g., used to power a transport climate control system) such as, for example, a leakage current; etc.

Examples of potential non-electric hazards can include: a working fluid leak of a working fluid used in a transport climate control system (e.g., a refrigerant, a $CO_2$, nitrogen, etc.); a fuel cell leak (e.g., a hydrogen leak of a hydrogen fuel cell); a fuel tank leak of a potentially flammable fuel used by, for example, a prime mover to generate mechanical power; a low tire pressure; an overheated hub/axle; dangerous cargo or a failure in containment of a cargo (e.g., a chemical leak); etc.

In one embodiment, a method for monitoring a potential hazard at an unoccupied transport unit and issuing a notification in response to detecting the potential hazard is provided. The method includes monitoring for the potential hazard at the unoccupied transport unit. The method also includes determining whether there is someone is in close proximity to the unoccupied transport unit upon determining the potential hazard. Also, the method includes providing a local notification of the potential hazard when it is determined that there is someone is in close proximity to the unoccupied transport unit and not providing the local notification of the potential hazard when it is determined that there is no one in close proximity to the unoccupied transport unit.

In another embodiment, a method for monitoring a potential hazard at an unoccupied transport unit and issuing a notification in response to detecting the potential hazard is provided. The method includes a hazard monitoring circuit monitoring for the potential hazard at the unoccupied transport unit and sending a monitoring signal to a controller. The controller determines the potential hazard based on the monitoring signal. Upon the controller determining the potential hazard, the controller determines whether there is someone is in close proximity to the unoccupied transport unit. The controller instructs an alert notification component to provide a local notification of the potential hazard when the controller determines that there is someone is in close proximity to the unoccupied transport unit. The controller does not instruct the alert notification component to provide the local notification of the potential hazard when the controller determines that there is no one in close proximity to the unoccupied transport unit. The alert notification component provides the local notification to anyone in close proximity to the unoccupied transport unit upon receiving an instruction from the controller.

In yet another embodiment, a hazard monitoring and notification system for monitoring a potential hazard at an unoccupied transport unit and issuing a notification in response to detecting the potential hazard is provided. The hazard monitoring and notification system includes a controller, a hazard monitoring circuit and an alert notification component. The hazard monitoring circuit is configured to monitor for the potential hazard at the unoccupied transport unit and is configured to send a monitoring signal to the controller. The alert notification component is configured to provide a local notification of the potential hazard upon receiving an instruction from the controller. The controller is configured to: determine the potential hazard based on the monitoring signal, upon the controller determining the potential hazard, determine whether there is someone is in close proximity to the unoccupied transport unit, instruct an alert notification component to provide the local notification of the potential hazard when the controller determines that there is someone is in close proximity to the unoccupied transport unit, and not instruct the alert notification component to provide the local notification of the potential hazard when the controller determines that there is no one in close proximity to the unoccupied transport unit.

BRIEF DESCRIPTION OF THE DRAWINGS

References are made to the accompanying drawings that form a part of this disclosure, and which illustrate embodiments in which the systems and methods described in this Specification can be practiced.

Like reference numbers represent like parts throughout.

DETAILED DESCRIPTION

Figure 1A:
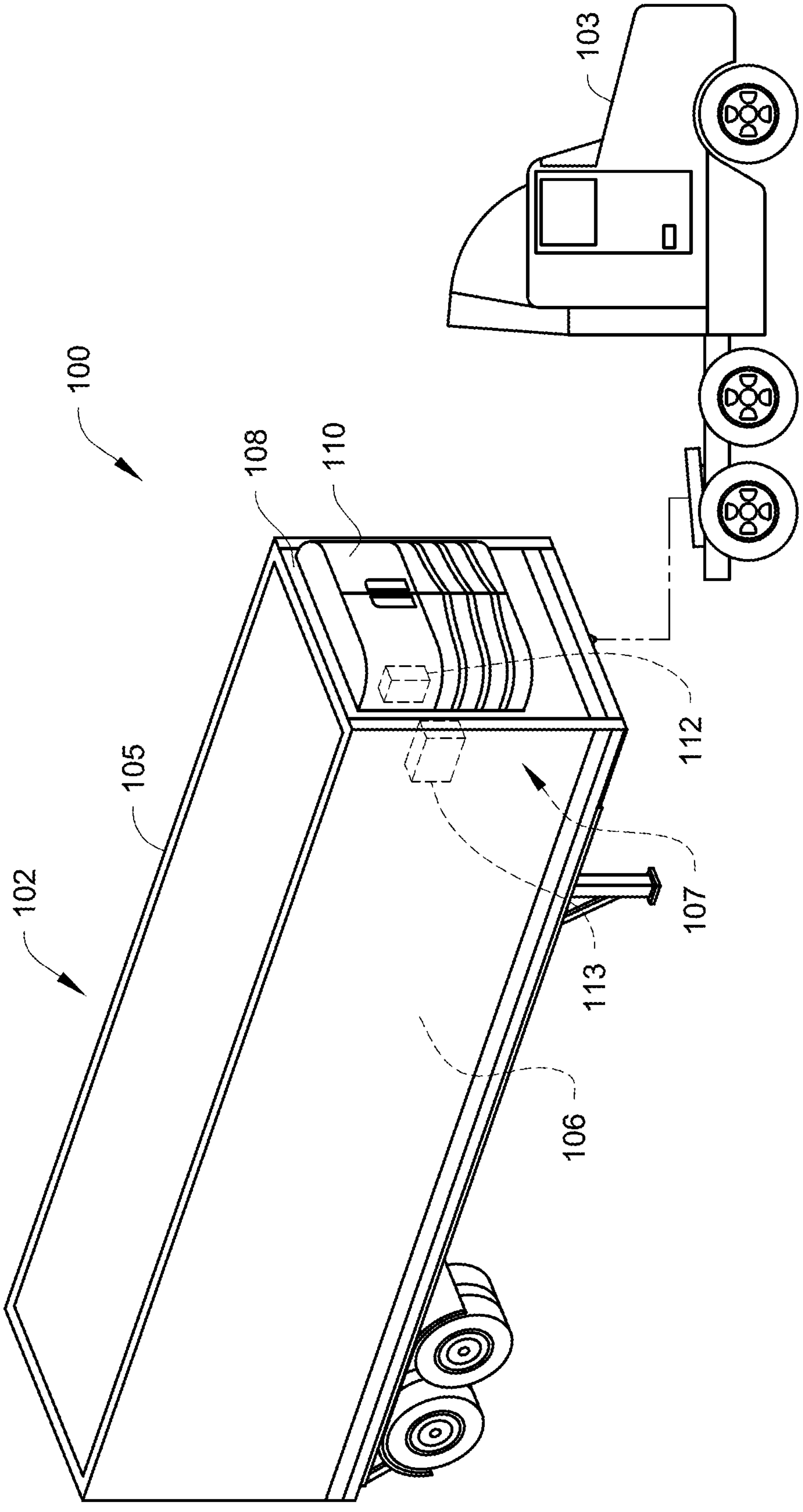
FIG. 1A illustrates a perspective view of a climate controlled transport unit with a transport climate control system attached to a tractor, according to one embodiment.

This disclosure relates generally to a transport climate control system. More specifically, this disclosure relates to methods and systems for monitoring a potential hazard at an unoccupied transport unit and issuing a notification in response to detecting the potential hazard.

A transport climate control system is generally used to control one or more environmental conditions such as, but not limited to, temperature, humidity, air quality, or combinations thereof, of a transport unit. Examples of transport units include, but are not limited to a truck, a container (such as a container on a flat car (e.g., a trailer), an intermodal container, a marine container, a rail container, etc.), a box car, a semi-tractor, a passenger vehicle, or other similar transport unit. A climate controlled transport unit can be used to transport perishable items such as pharmaceuticals, produce, frozen foods, and meat products and/or can be used to provide climate comfort for passengers in a passenger space of a passenger vehicle. The transport climate control system may include a vapor-compressor type climate controlled system, a thermal accumulator type system, or any other suitable climate controlled system that can use a working fluid (e.g., refrigerant, cryogen, etc.), cold plate technology, or the like. In some embodiments, the transport climate control system can include, for example, a vapor compression refrigeration system, a cryogen based refrigeration system, a eutectic based refrigeration system, a heat plate refrigeration system, etc. In some embodiments, the working fluid can be a mildly flammable refrigerant/refrigerant blend (e.g., classified as A2L) and can lead to a dangerous flammable environment when leaked into an enclosed space.

A transport climate control system can include a climate control unit (CCU) attached to a transport unit to control one or more environmental conditions (e.g., temperature, humidity, air quality, etc.) of a climate controlled space of the climate controlled transport unit. The CCU can include, without limitation, a climate control circuit (including, for example, a compressor, a condenser, an expansion valve, and an evaporator), and one or more fans or blowers to control the heat exchange between the air within the climate controlled space and the ambient air outside of the climate controlled transport unit.

As defined herein, "low voltage" refers to Class A of the ISO 6469-3 in the automotive environment, in particular, a maximum working voltage of between about 0V to 60V DC or between about 0V to 30V AC. As defined herein, "high voltage" refers to Class B of the ISO 6469-3 in the automotive environment, in particular, a maximum working voltage of between about 60V to 1500V DC or between about 30V to 1000V AC.

An unoccupied transport unit can include, for example, a non-passenger transport unit (e.g., a truck, a container (such as a container on a flat car (e.g., trailer), an intermodal container, a marine container, etc.), a box car, a semi-tractor, or other similar transport unit), etc.), a passenger transport unit that is presently unoccupied (e.g., an unoccupied mass-transit bus, an unoccupied passenger rail car, etc.), a transport unit or equipment in storage, etc.

As defined herein, a "local notification" refers to an alert notification that is configured to be provided to one or more people at or in close proximity to the unoccupied transport unit. Accordingly, someone approaching the unoccupied transport unit would be able to observe the alert notification.

As defined herein, a "remote notification" refers to an alert notification that is configured to be provided to one or more people remote from the unoccupied transport unit.

As defined herein, "close proximity" refers to an area surrounding the unoccupied transport unit at which someone can generally observe a local notification provided by the unoccupied transport unit or a climate control unit of a transport climate control system providing climate control to a climate controlled space of the unoccupied transport unit.

In some embodiments, the distance at which the local notification can be generally observed can be based on a distance range monitored by a proximity sensor of a proximity detection device. Accordingly, the distance range can be a set radius away from the unoccupied transport unit and particularly a set radius from the proximity sensor. In some embodiments, the proximity sensor used by the embodiments described herein can be chosen based on the distance range the proximity sensor is capable of monitoring.

FIGS. 1A-1D show various transport climate control systems. It will be appreciated that the embodiments described herein are not limited to the examples provided below, but can apply to any type of unoccupied transport unit (e.g., a truck, a container (such as a container on a flat car (e.g., trailer), an intermodal container, a marine container, etc.), a box car, a semi-tractor, a passenger vehicle, or other similar transport unit), etc.

FIG. 1A illustrates one embodiment of a climate controlled transport unit 102 attached to a tractor 103. The climate controlled transport unit 102 includes a transport climate control system 100 for a transport unit 105. The tractor 103 is attached to and is configured to tow the transport unit 105. The transport unit 105 shown in FIG. 1A is a trailer.

The transport climate control system 100 includes a climate control unit (CCU) 110 that provides environmental control (e.g. temperature, humidity, air quality, etc.) within a climate controlled space 106 of the transport unit 105. The climate control system 100 also includes a programmable climate controller 107 and one or more sensors (not shown) that are configured to measure one or more parameters of the climate control system 100 (e.g., an ambient temperature outside of the transport unit 105, a space temperature within the climate controlled space 106, an ambient humidity outside of the transport unit 105, a space humidity within the climate controlled space 106, etc.) and communicate parameter data to the climate controller 107.

The transport climate control system 100 may include a vapor-compressor type climate controlled system, a thermal accumulator type system, or any other suitable climate controlled system that can use a working fluid (e.g., refrigerant, cryogen, etc.), cold plate technology, or the like. In some embodiments, the transport climate control system 100 can include, for example, a vapor compression refrigeration system, a cryogen based refrigeration system, a eutectic based refrigeration system, a heat plate refrigeration system, etc. In some embodiments, the working fluid can be a mildly flammable refrigerant/refrigerant blend (e.g., classified as A2L) and can lead to a dangerous flammable environment when leaked into an enclosed space.

The transport climate control system 100 can operate in multiple operation modes including, for example, a continuous cooling mode, a start/stop cooling mode, a heating mode, a defrost mode, a null mode, etc. When operating in a continuous cooling mode and/or a start-stop cooling mode, the transport climate control system 100 can operate in a pulldown setting and in a steady-state setting. The pulldown setting generally occurs when, for example, the climate controlled space 106 is being cooled from an ambient temperature down to a desired set-point temperature so that the transport climate control system 100 can bring the temperature down to the desired set-point temperature as quickly as possible. The steady-state setting generally occurs when, for example, the climate in the climate controlled space 106 has already reached or is close to approaching a desired set-point temperature and the transport climate control system 100 is working to maintain the desired set-point temperature.

The CCU 110 is disposed on a front wall 108 of the transport unit 105. In other embodiments, it will be appreciated that the CCU 110 can be disposed, for example, on a rooftop or another wall of the transport unit 105. The CCU 110 includes a transport climate control circuit (not shown) that connects, for example, a compressor, a condenser, an evaporator and an expander (e.g., expansion valve) to provide conditioned air within the climate controlled space 106. In some embodiments, the CCU 110 can include one or more of a status light panel, an external light alarm, an external speaker, a human machine interface (HMI), a telematics unit, and any other components that can communicate with someone in close proximity or remote from the CCU 110.

The climate controller 107 may comprise a single integrated control unit 112 or may comprise a distributed network of climate controller elements 112, 113. The number of distributed control elements in a given network can depend upon the particular application of the principles described herein. The climate controller 107 is configured to control operation of the climate control system 100 including the transport climate control circuit.

The climate control system 100 can be powered by a power system (not shown) that can distribute power to the climate control system 100 when a utility power source is unavailable. In some embodiments, the power system can be housed within the CCU 110. In some embodiments, the power system can be a generator set (not shown) attached to the transport unit 105 and connected to one or more components of the climate control system 100 (e.g., a compressor, one or more fans and/or blowers, the climate controller 107, one or more sensors, etc.). In some embodiments, a fuel tank (not shown) can be provided for supplying fuel, for example, to a prime mover of the power system. The fuel tank can be part of or separate from the power system.

The transport unit 105 and/or the climate control system 100 can be subject to different types of electric and non-electric hazards. Examples of potential electric hazards can include: a high voltage DC isolation failure where, for example, a positive or negative terminal (or both) is in physical contact with a chassis (e.g., single or double isolation faults); a generator fault of a generator (e.g., used to power the transport climate control system 100) such as, for example, a leakage current; etc.

Examples of potential non-electric hazards can include: a working fluid leak of a working fluid used in the transport climate control system 100 (e.g., a refrigerant, a $CO_2$, nitrogen, etc.); a fuel cell leak (e.g., a hydrogen leak of a hydrogen fuel cell); a fuel tank leak of a potentially flammable fuel used by, for example, a prime mover to generate mechanical power; a low tire pressure; an overheated hub/axle; dangerous cargo or a failure in containment of a cargo stored within the climate controlled space 106 (e.g., a chemical leak); etc.

As discussed in more detail below with respect to FIG. 2, the transport unit 105 and/or the climate control system 100 can include one or more alert notification components that can provide a local notification of a potential hazard. The one or more alert notification components can provide one or more of an audio notification, a visual notification, a sensory notification, a digital notification, a telematics notification, etc. of a potential hazard at or near the transport unit 105.

Figure 1B:
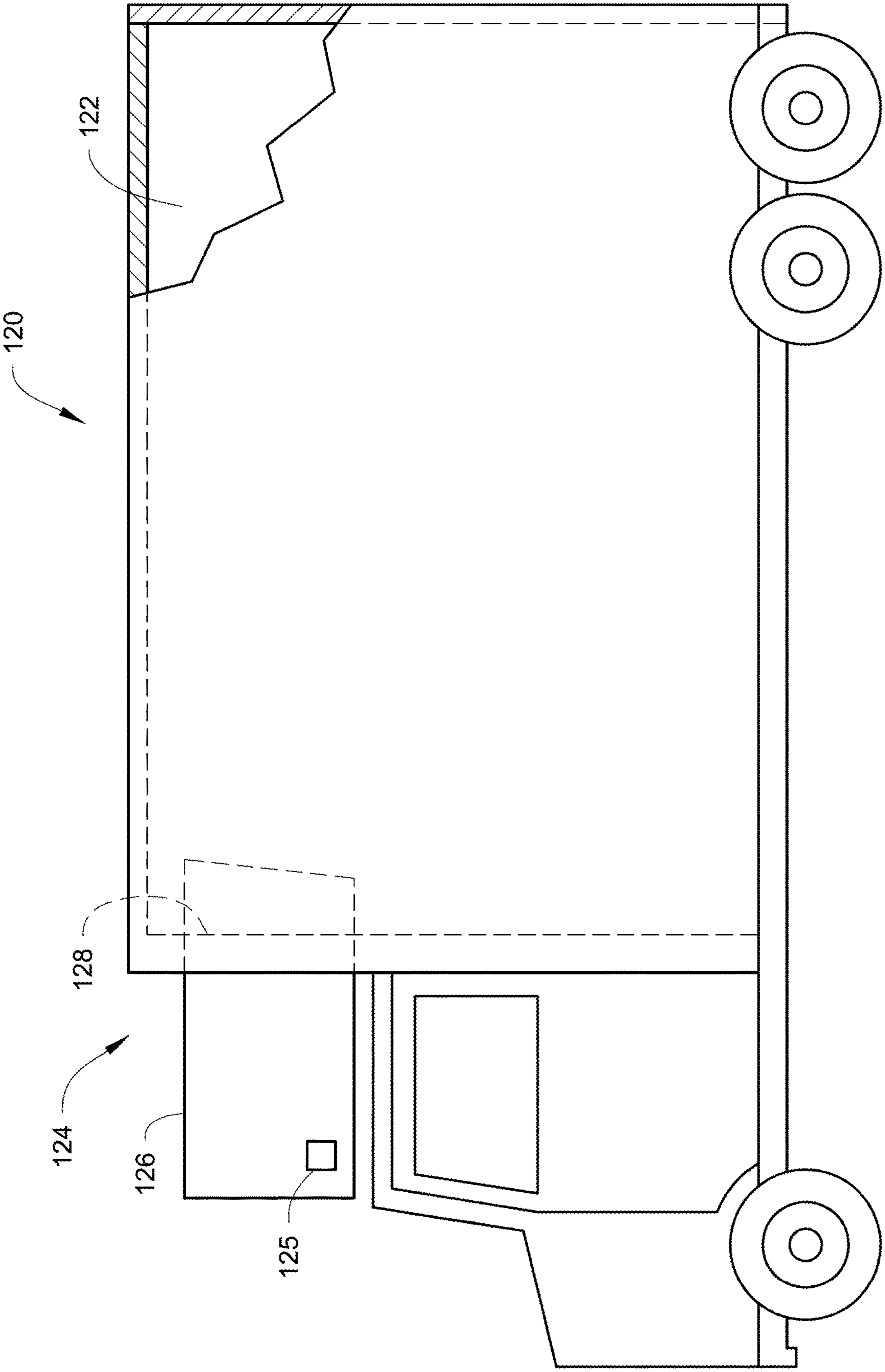
FIG. 1B illustrates a side view of a truck with a transport climate control system, according to one embodiment.

FIG. 1B is a side view of a truck 120 with a transport climate control system 124, according to an embodiment. The truck 120 includes a climate controlled space 122 for carrying cargo. The transport climate control system 124 includes a CCU 126 that is mounted to a front wall 128 of the climate controlled space 122. The CCU 126 can include, among other components, a climate control circuit (not shown) that connects, for example, a compressor, a condenser, an evaporator, and an expander (e.g., expansion valve) to provide climate control within the climate controlled space 122. In an embodiment, the CCU 126 can be a transport refrigeration unit.

The transport climate control system 124 also includes a programmable climate controller 125 and one or more climate control sensors (not shown) that are configured to measure one or more parameters of the transport climate control system 124 (e.g., an ambient temperature outside of the truck 120, an ambient humidity outside of the truck 120, a compressor suction pressure, a compressor discharge pressure, a supply air temperature of air supplied by the CCU 126 into the climate controlled space 122, a return air temperature of air returned from the climate controlled space 122 back to the CCU 126, a humidity within the climate controlled space 122, etc.) and communicate climate control data to the climate controller 125. The one or more climate control sensors can be positioned at various locations outside the truck 120 and/or inside the truck 120 (including within the climate controlled space 122).

In some embodiments, the CCU 126 can include one or more of a status light panel, an external light alarm, an external speaker, a human machine interface (HMI), a telematics unit, and any other components that can communicate with someone in close proximity or remote from the CCU 126.

The transport climate control system 124 may include a vapor-compressor type climate controlled system, a thermal accumulator type system, or any other suitable climate controlled system that can use a working fluid (e.g., refrigerant, cryogen, etc.), cold plate technology, or the like. In some embodiments, the transport climate control system 124 can include, for example, a vapor compression refrigeration system, a cryogen based refrigeration system, a eutectic based refrigeration system, a heat plate refrigeration system, etc. In some embodiments, the working fluid can be a mildly flammable refrigerant/refrigerant blend (e.g., classified as A2L) and can lead to a dangerous flammable environment when leaked into an enclosed space.

The transport climate control system 124 can operate in multiple operation modes including, for example, a continuous cooling mode, a start/stop cooling mode, a heating mode, a defrost mode, a null mode, etc. When operating in a continuous cooling mode and/or a start-stop cooling mode, the transport climate control system 124 can operate in a pulldown setting and in a steady-state setting. The pulldown setting generally occurs when, for example, the climate controlled space 122 is being cooled from an ambient temperature down to a desired set-point temperature so that the transport climate control system 124 can bring the temperature down to the desired set-point temperature as quickly as possible. The steady-state setting generally occurs when, for example, the climate in the climate controlled space 122 has already reached or is close to approaching a desired set-point temperature and the transport climate control system 124 is working to maintain the desired set-point temperature.

The climate controller 125 is configured to control operation of the transport climate control system 124 including components of the climate control circuit. The climate controller 125 may include a single integrated control unit or may include a distributed network of climate controller elements (not shown). The number of distributed control elements in a given network can depend upon the particular application of the principles described herein. The measured parameters obtained by the one or more climate control sensors can be used by the climate controller 125 to control operation of the climate control system 124.

The climate control system 124 is powered by a power system (not shown) that can distribute power to the climate control system 124 when a utility power source is unavailable. In some embodiments, the power system can be housed within the CCU 126. In some embodiments, the power system can be housed within the truck 120 and connected to one or more components of the climate control system 124 (e.g., a compressor, one or more fans and/or blowers, the climate controller 145, one or more sensors, etc.). In some embodiments, the power system can be a generator set (not shown) attached to the truck 120 and connected to one or more components of the climate control system 124 (e.g., a compressor, one or more fans and/or blowers, the climate controller 125, one or more sensors, etc.). In some embodiments, a fuel tank (not shown) can be provided for supplying fuel, for example, to a prime mover of the power system. The fuel tank can be part of or separate from the power system.

The truck 120 and/or the climate control system 124 can be subject to different types of electric and non-electric hazards. Examples of potential electric hazards can include: a high voltage DC isolation failure where, for example, a positive or negative terminal (or both) is in physical contact with a chassis (e.g., single or double isolation faults); a generator fault of a generator (e.g., used to power the transport climate control system 124) such as, for example, a leakage current; etc.

Examples of potential non-electric hazards can include: a working fluid leak of a working fluid used in the transport climate control system 124 (e.g., a refrigerant, a $CO_2$, nitrogen, etc.); a fuel cell leak (e.g., a hydrogen leak of a hydrogen fuel cell); a fuel tank leak of a potentially flammable fuel used by, for example, a prime mover to generate mechanical power; a low tire pressure; an overheated hub/axle; dangerous cargo or a failure in containment of a cargo stored within the climate controlled space 122 (e.g., a chemical leak); etc.

As discussed in more detail below with respect to FIG. 2, the truck 120 and/or the climate control system 124 can include one or more alert notification components that can provide a local notification of a potential hazard. The one or more alert notification components can provide one or more of an audio notification, a visual notification, a sensory notification, a digital notification, a telematics notification, etc. of a potential hazard at or near the truck 120.

Figure 1C:
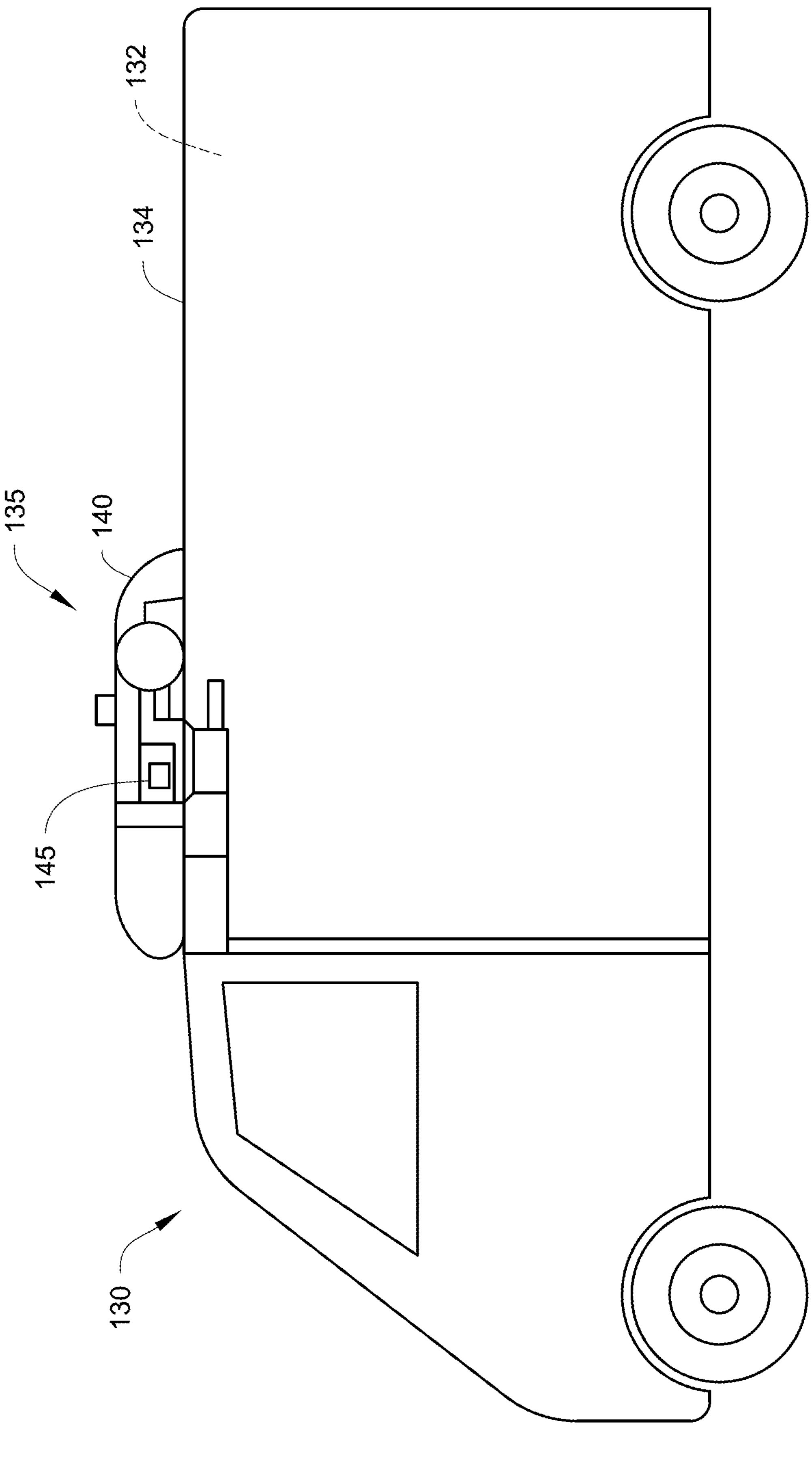
FIG. 1C illustrates a side view of a van with a transport climate control system, according to one embodiment.

FIG. 1C depicts a side view of a van 130 with a transport climate control system 135 for providing climate control within a climate controlled space 132, according to one embodiment. The transport climate control system 135 includes a climate control unit (CCU) 140 that is mounted to a rooftop 134 of the van 130. In an embodiment, the CCU 140 can be a transport refrigeration unit. The climate control system 135 also includes a programmable climate controller 145 and one or more sensors (not shown) that are configured to measure one or more parameters of the climate control system 135 (e.g., an ambient temperature outside of the van 130, a space temperature within the climate controlled space 132, an ambient humidity outside of the van 130, a space humidity within the climate controlled space 132, etc.) and communicate parameter data to the climate controller 145.

In some embodiments, the CCU 140 can include one or more of a status light panel, an external light alarm, an external speaker, a human machine interface (HMI), a telematics unit, and any other components that can communicate with someone in close proximity or remote from the CCU 140.

The transport climate control system 135 may include a vapor-compressor type climate controlled system, a thermal accumulator type system, or any other suitable climate controlled system that can use a working fluid (e.g., refrigerant, cryogen, etc.), cold plate technology, or the like. In some embodiments, the transport climate control system 135 can include, for example, a vapor compression refrigeration system, a cryogen based refrigeration system, a eutectic based refrigeration system, a heat plate refrigeration system, etc. In some embodiments, the working fluid can be a mildly flammable refrigerant/refrigerant blend (e.g., classified as A2L) and can lead to a dangerous flammable environment when leaked into an enclosed space.

The transport climate control system 135 can include, among other components, a transport climate control circuit (not shown) that connects, for example, a compressor, a condenser, an evaporator, and an expander (e.g., an expansion valve) to provide climate control within the climate controlled space 132.

The transport climate control system 135 can operate in multiple operation modes including, for example, a continuous cooling mode, a start/stop cooling mode, a heating mode, a defrost mode, a null mode, etc. When operating in a continuous cooling mode and/or a start-stop cooling mode, the transport climate control system 135 can operate in a pulldown setting and in a steady-state setting. The pulldown setting generally occurs when, for example, the climate controlled space 132 is being cooled from an ambient temperature down to a desired set-point temperature so that the transport climate control system 135 can bring the temperature down to the desired set-point temperature as quickly as possible. The steady-state setting generally occurs when, for example, the climate in the climate controlled space 132 has already reached or is close to approaching a desired set-point temperature and the transport climate control system 135 is working to maintain the desired set-point temperature.

The climate controller 145 may comprise a single integrated control unit or may comprise a distributed network of climate controller elements (not shown). The number of distributed control elements in a given network can depend upon the particular application of the principles described herein. The climate controller 145 is configured to control operation of the climate control system 135 including the transport climate control circuit.

The climate control system 135 is powered by a power system that can distribute power to the climate control system 135 when a utility power source is unavailable. In some embodiments, the power system can be housed within the CCU 140. In some embodiments, the power system can be housed within the van 130 and connected to one or more components of the climate control system 135 (e.g., a compressor, one or more fans and/or blowers, the climate controller 145, one or more sensors, etc.). In some embodiments, the power system can be a generator set (not shown) attached to the van 130 and connected to one or more components of the climate control system 135 (e.g., a compressor, one or more fans and/or blowers, the climate controller 145, one or more sensors, etc.). In some embodiments, a fuel tank (not shown) can be provided for supplying fuel, for example, to a prime mover of the power system. The fuel tank can be part of or separate from the power system.

The van 130 and/or the climate control system 135 can be subject to different types of electric and non-electric hazards. Examples of potential electric hazards can include: a high voltage DC isolation failure where, for example, a positive or negative terminal (or both) is in physical contact with a chassis (e.g., single or double isolation faults); a generator fault of a generator (e.g., used to power the transport climate control system 135) such as, for example, a leakage current; etc.

Examples of potential non-electric hazards can include: a working fluid leak of a working fluid used in the transport climate control system 135 (e.g., a refrigerant, a $CO_2$, nitrogen, etc.); a fuel cell leak (e.g., a hydrogen leak of a hydrogen fuel cell); a fuel tank leak of a potentially flammable fuel used by, for example, a prime mover to generate mechanical power; a low tire pressure; an overheated hub/axle; dangerous cargo or a failure in containment of a cargo stored within the climate controlled space 132 (e.g., a chemical leak); etc.

As discussed in more detail below with respect to FIG. 2, the van 130 and/or the climate control system 135 can include one or more alert notification components that can provide a local notification of a potential hazard. The one or more alert notification components can provide one or more of an audio notification, a visual notification, a sensory notification, a digital notification, a telematics notification, etc. of a potential hazard at or near the van 130.

Figure 1D:
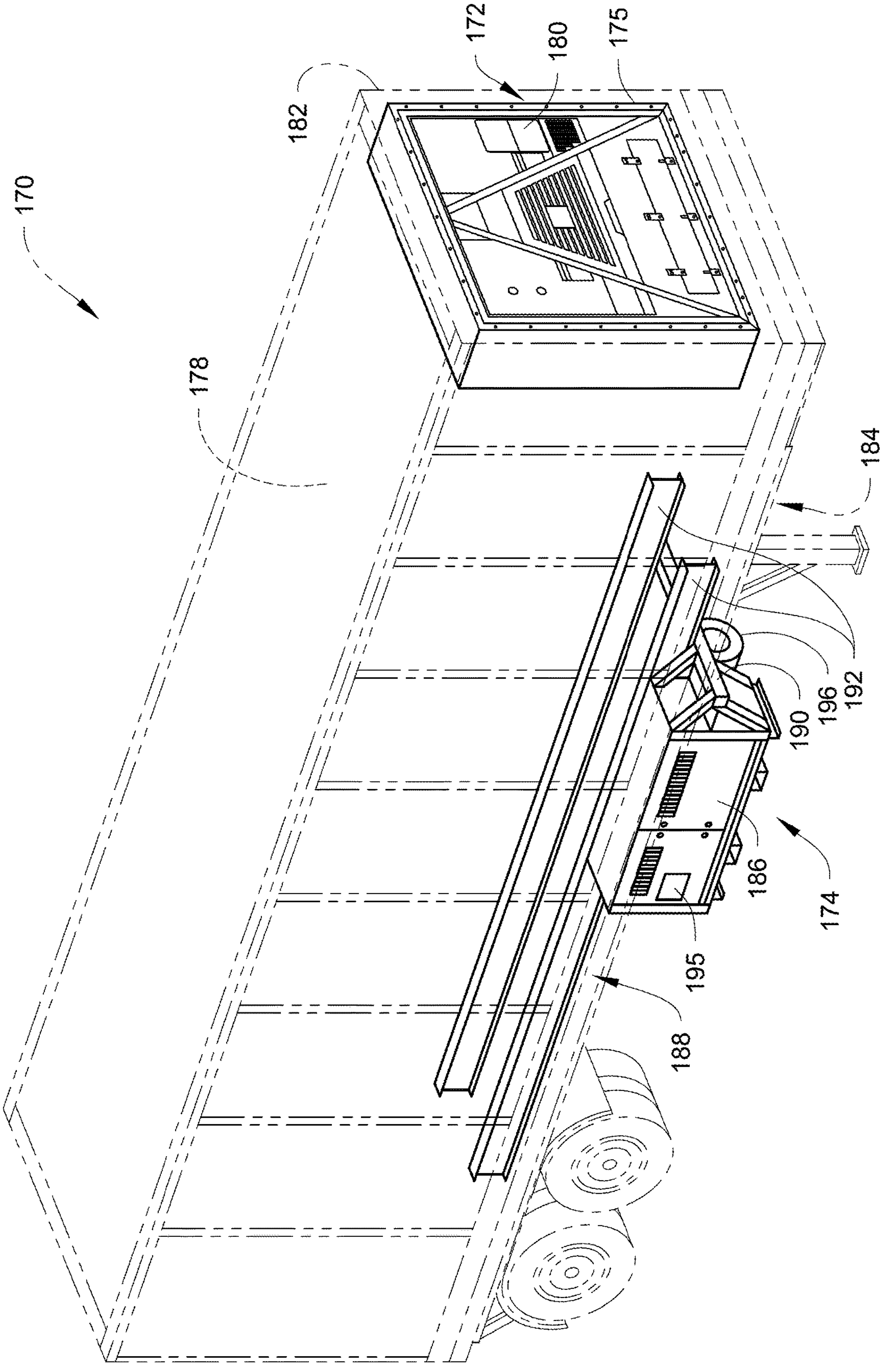
FIG. 1D illustrates a perspective view of a container that includes a transport climate control system, according to one embodiment, according to one embodiment.

FIG. 1D illustrates one embodiment of an intermodal container 170 with a transport climate control system 172 and a power system 174. The intermodal container 170 can be used across different modes of transport including, for example, ship, rail, tractor-trailer, etc.

The transport climate control system 172 includes a climate control unit (CCU) 175 that provides environmental control (e.g. temperature, humidity, air quality, etc.) within a climate controlled space 178 of the intermodal container 170. The transport climate control system 172 also includes a programmable climate controller 180 and one or more sensors (not shown) that are configured to measure one or more parameters of the transport climate control system 172 (e.g., an ambient temperature outside of the intermodal container 170, a space temperature within the climate controlled space 178, an ambient humidity outside of the intermodal container 170, a space humidity within the climate controlled space 178, etc.) and communicate parameter data to the climate controller 180.

The transport climate control system 172 may include a vapor-compressor type climate controlled system, a thermal accumulator type system, or any other suitable climate controlled system that can use a working fluid (e.g., refrigerant, cryogen, etc.), cold plate technology, or the like. In some embodiments, the transport climate control system 172 can include, for example, a vapor compression refrigeration system, a cryogen based refrigeration system, a eutectic based refrigeration system, a heat plate refrigeration system, etc. In some embodiments, the working fluid can be a mildly flammable refrigerant/refrigerant blend (e.g., classified as A2L) and can lead to a dangerous flammable environment when leaked into an enclosed space.

When operating in a continuous cooling mode and/or a start-stop cooling mode, the transport climate control system 172 can operate in a pulldown setting and in a steady-state setting. The pulldown setting generally occurs when, for example, the climate controlled space 178 is being cooled from an ambient temperature down to a desired set-point temperature so that the transport climate control system 172 can bring the temperature down to the desired set-point temperature as quickly as possible. The steady-state setting generally occurs when, for example, the climate in the climate controlled space 178 has already reached or is close to approaching a desired set-point temperature and the transport climate control system 172 is working to maintain the desired set-point temperature.

The CCU 175 is disposed on a front wall 182 of the intermodal container 170. In other embodiments, it will be appreciated that the CCU 175 can be disposed, for example, on a rooftop or another wall of the intermodal container 170. The CCU 175 includes a transport climate control circuit (not shown) that connects, for example, a compressor, a condenser, an evaporator and an expander (e.g., expansion valve) to provide conditioned air within the climate controlled space 178.

In some embodiments, the CCU 175 can include one or more of a status light panel, an external light alarm, an external speaker, a human machine interface (HMI), a telematics unit, and any other components that can communicate with someone in close proximity or remote from the CCU 175.

The climate controller 180 may comprise a single integrated control unit or may comprise a distributed network of climate controller elements (not shown). The number of distributed control elements in a given network can depend upon the particular application of the principles described herein. The climate controller 180 is configured to control operation of the climate control system 172 including the transport climate control circuit.

The climate control system 172 is powered by the power system 174 that can distribute power to the climate control system 172 when a utility power source is unavailable. In this embodiment, the power system 174 is a generator set disposed on a bottom wall 184 of the intermodal container 170 and connected to one or more components of the climate control system 172 (e.g., a compressor, one or more fans and/or blowers, the climate controller 180, one or more sensors, etc.).

In this embodiment, the power system 174 includes a housing 186 attached to a frame 188 by a mounting assembly 190. The mounting assembly 190 can extend between the housing 186 and cross members 192 that are part of the frame 188. The mounting assembly 190 can be made of a high-strength material (e.g., steel, etc.) to rigidly attach the power system 174 to the intermodal container 170. The power system 174 includes a power system controller 195 that is configured to control operation of the power system 174.

A fuel tank 196 is also provided and configured to supply fuel to, for example, a prime mover of the power system 174. The fuel tank 196 can be part of or separate from the power system 174.

The intermodal container 170 and/or the climate control system 172 can be subject to different types of electric and non-electric hazards. Examples of potential electric hazards can include: a high voltage DC isolation failure where, for example, a positive or negative terminal (or both) is in physical contact with a chassis (e.g., single or double isolation faults); a generator fault of a generator (e.g., used to power the transport climate control system 172) such as, for example, a leakage current; etc.

Examples of potential non-electric hazards can include: a working fluid leak of a working fluid used in the transport climate control system 172 (e.g., a refrigerant, a $CO_2$, nitrogen, etc.); a fuel cell leak (e.g., a hydrogen leak of a hydrogen fuel cell); a fuel tank leak of a potentially flammable fuel used by, for example, a prime mover to generate mechanical power; a low tire pressure; an overheated hub/axle; dangerous cargo or a failure in containment of a cargo stored within the climate controlled space 178 (e.g., a chemical leak); etc.

As discussed in more detail below with respect to FIG. 2, the intermodal container 170 and/or the climate control system 172 can include one or more alert notification components that can provide a local notification of a potential hazard. The one or more alert notification components can provide one or more of an audio notification, a visual notification, a sensory notification, a digital notification, a telematics notification, etc. of a potential hazard at or near the intermodal container 170.

Figure 2:
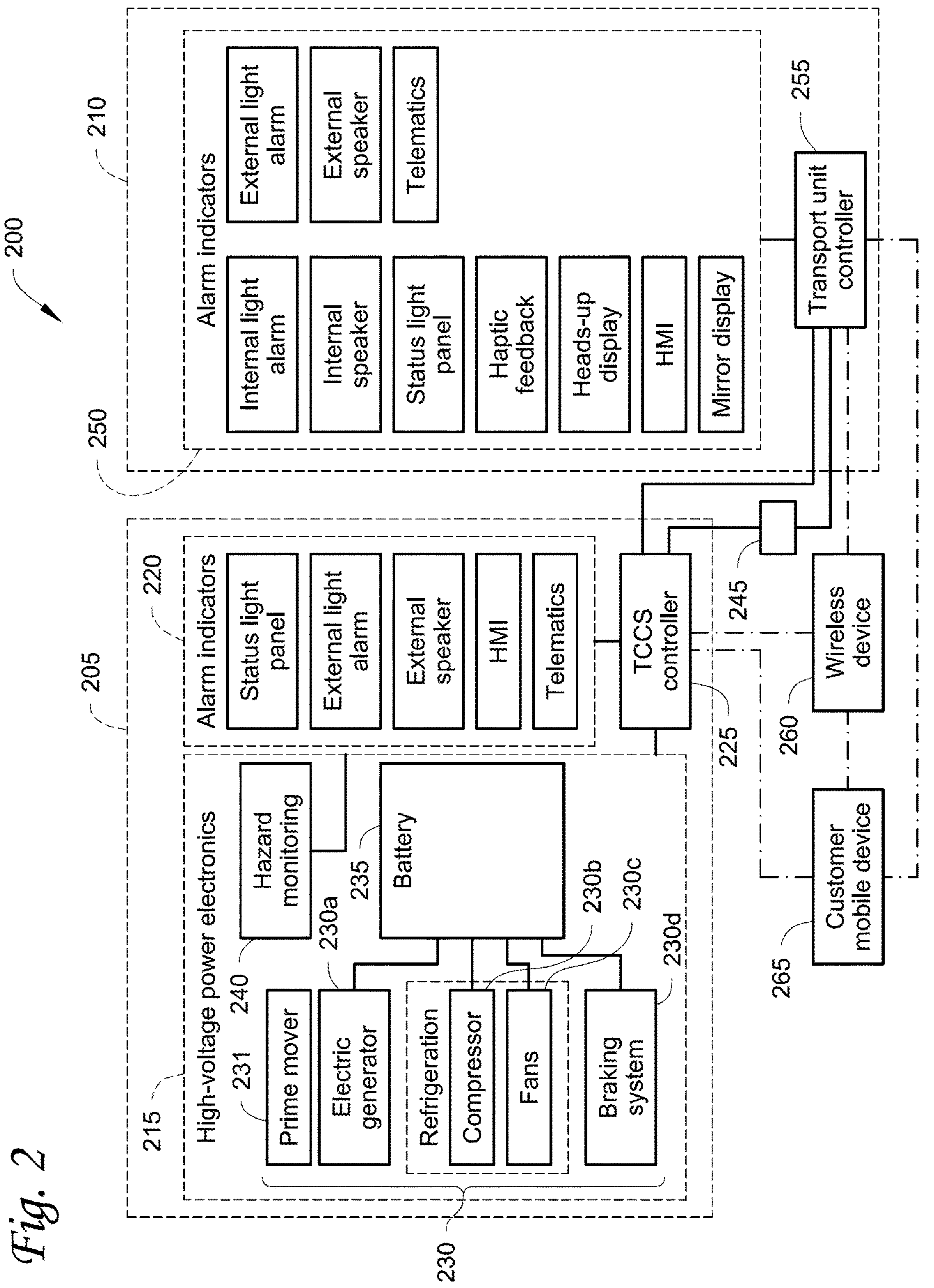
FIG. 2 illustrates a schematic view of a hazard monitoring and notification system, according to one embodiment.

FIG. 2 illustrates a schematic view of a hazard monitoring and notification system 200, according to one embodiment. The hazard monitoring and notification system 200 is configured to monitor hazards in a transport unit and generate an alert notification when a potential hazard is monitored. The alert notification can be a local notification that can be generally observed by someone approaching and/or in close proximity of the unoccupied transport unit or a remote notification that can be generally observed by someone that is away from and/or not in close proximity to the unoccupied transport unit. The hazard monitoring and notification system 200 can be used with any of the climate controlled transport units (e.g., the climate controlled transport unit 100, the truck 120, the van 130, the intermodal container 170) shown in FIGS. 1A-D. In some embodiments, the hazard monitoring system 200 can be configured to concurrently monitor hazards in multiple transport units (e.g., stacked intermodal containers at a fleet yard). The hazard monitoring system 200 includes a climate control unit 205, a transport unit notification system 210, and a proximity detection device 245.

The climate control system 205 includes a high voltage power electronics system 215, plurality of climate control alert notification components 220, and a transport climate system controller 225. The high voltage power electronics system 215 includes a plurality of high voltage power components 230 connected to a high voltage battery 235. The high voltage power electronics system 215 also includes a hazard monitoring circuit 240 communicatively connected to the transport climate control system controller 225.

The high voltage power components 230 require high DC voltage (e.g., between 60-1500V DC) as opposed to a low DC voltage (e.g., between 0-60V DC). The high voltage power components 230 include: an electric generator 230*a* that can also be driven by a prime mover 231; transport climate control components including a compressor 230*b*, and one or more fans/blowers 230*c*; and optionally a braking system 230*d* of the transport unit (e.g., an electric-actuated braking system, air from truck to trailer braking system, an electric signal braking system, etc.).

The high voltage battery 235 is configured to provide a high voltage (e.g., between 60-1500V DC) to each of the high voltage power components 230.

The hazard monitoring circuit 240 include one or more sensors (not shown) configured to monitor the transport climate control system and/or the unoccupied transport unit (including cargo stored therein) for a potential hazard that could be dangerous to someone in close proximity to the climate controlled transport unit. The hazard can be an electrical hazard, a non-electric hazard, etc.

Examples of potential electric hazards can include: a high voltage DC isolation failure where, for example, a positive or negative terminal (or both) is in physical contact with a chassis that can be detected, for example, based on a resistance measurement or any measurement that detects whether trace amounts of current are detected on a return path or in a path the current is not expected to follow; a generator fault of a generator (e.g., used to power a transport climate control system) such as, for example, a leakage current that can be detected, for example, based on hardware or firmware detection using a dedicated module or control feature, a resistance measurement or any measurement that detects whether trace amounts of current are detected on a return path or in a phat that the current is not expected to follow, etc.; etc.

Examples of potential non-electric hazards can include: a working fluid leak of a working fluid used in a transport climate control system (e.g., a refrigerant including A2L refrigerants, a $CO_2$, nitrogen, cryogen, etc.) that can be detected using, for example, gas monitoring equipment; a fuel cell leak (e.g., a hydrogen leak of a hydrogen fuel cell) that can be detected using, for example, gas monitoring equipment; a fuel tank leak of a potentially flammable fuel (e.g., diesel fuel, etc.) used by, for example, a prime mover to generate mechanical power that can be detected using, for example, gas monitoring equipment; a low tire pressure that can be monitored by, for example, a tire pressure sensor on each of the tires; an overheated hub/axle that can be detected, for example, via one or more temperature sensors, a thermal scan, or one or more vibration sensors (when bearing related); dangerous cargo or a failure in containment of a cargo (e.g., a chemical leak) that can be detected, for example, using one or more thermal scans, temperature sensors, gas monitoring equipment, one or more oxygen sensors (where oxygen has been depleted from a climate controlled space atmosphere, etc.; etc. The hazard monitoring circuit 240 is communicatively connected to the transport climate control system controller 225 and is configured to send one or more monitoring signals to the transport climate control system controller 225 indicating whether a potential hazard has been detected.

The transport climate control system controller 225 is configured to control operation of the transport climate control system and monitor the hazard monitoring circuit 240. The transport climate control system controller 225 is communicatively connected to the climate control alert notification components 220 and the transport unit controller 255. Communication between the transport climate control system controller 225 and either of the climate control alert notification components 220 and the transport unit controller 255 can be over a wired line (e.g., a controller area network (CAN) bus, a local interconnect network (LIN), etc.) or a wireless communication protocol (e.g., Bluetooth communication protocol, etc.). The transport climate control system controller 225 can also optionally communicate with a wireless device 260 via a wireless communication system (e.g., cellular communication, satellite communication, Wi-Fi, Bluetooth, etc.).

The transport climate control system controller 225 receives monitoring signal(s) from the one or more sensors of the hazard monitoring circuit 240 and determines whether there is a potential hazard based on the received monitoring signal(s). When the transport climate control system controller 225 determines that a potential hazard has occurred, the transport climate control system controller 225 can instruct one or more of the climate control alert notification components 220 to provide one or more alert notifications (e.g., a local notification, a remote notification, or a combination thereof). The transport climate control system controller 225 can also send a message to the transport unit controller 255 so that the transport unit controller 225 can instruct one or more of the transport unit alert notification components 250 to provide one or more alert notifications. Also, the transport climate control system controller 225 can optionally communicate the potential hazard to the wireless device 260 and/or customer mobile device 265 to provide a remote notification of the potential hazard. In some embodiments, the transport climate control system controller 225 can communicate with one or more of the wireless device 260 and/or the customer mobile device 265 to send, for example, warning(s), alarm condition(s), diagnostic information, service and work direction, valve and shut-off location(s) for emergency medical services (EMS), lock-out point(s) and areas where not to cut or disturb high voltage or compressed gas lines for first responders, etc. In some embodiments, the transport climate control system controller 225 can provide, based on the potential hazard, an instruction to one or more components of the transport climate control system (e.g., one or more of the high voltage power components 230) to isolate the source of the potential hazard as a safety measure and to potentially allow other components of the transport climate control system to operate uninterrupted. For example, gases can be purged to a controlled vent location, high voltage components can be shut off and isolated to batteries while the system is discharged, fire(s) can be extinguished by a fire suppression system, etc. Operation of the transport climate control system controller 225, according to one embodiment, is discussed below with respect to FIGS. 3A-B below.

The climate control alert notification components 220 are configured to provide a local and/or remote notification that there is a potential hazard at the transport unit and/or the transport climate control system upon receiving an instruction from the transport climate control system controller 225. In some embodiments, the climate control alert notification components 220 can be powered by, for example, a 12 V battery.

The climate control alert notification components 220 includes: a status light panel **220*a* provided on or within the transport climate control unit and visible on the rear-view mirror from a driver position that can, for example, blink/flash or steady one or more status lights to indicate the potential hazard on the climate control unit; an external light alarm 220*b* provided on the transport climate control unit that can, for example, blink/flash or steady one or more status lights to indicate the potential hazard outside of the climate control unit; an external speaker 220*c* provided on the transport climate control unit that can, for example, generate an alarm sound or verbal message of the potential hazard outside of the climate control unit; a human machine interface (HMI) 220*d* of the transport climate control unit that can, for example, display text, blink/flash or steady a light, or send an audible sound or verbal message to indicate the potential hazard on the climate control unit; a telematics unit 220*e* of the transport climate control unit configured to store and send an alert notification as a digital message to one or more remote devices away from the transport unit. In some embodiments, the telematics unit 220*e* can, based on the detected potential hazard, send a message (e.g., short message service (SMS) message) to an emergency service (e.g., local police or fire department). In some embodiments, the telematics unit 220*e* can provide a local notification via, for example, a quick response (QR) code scan (for EMS, first responders, etc.), a voice notification, etc. In some embodiments, the telematics unite 220***e* can be connected to a third party device via an app, a website, a Bluetooth or an active network connection, etc. to provide the local notification.

One or more of the climate control alert notification components 220 can provide different notifications based on the type potential hazard detected. It will be appreciated that in some embodiments, the climate control alert notification components 220 can include some but not all of those listed above. Also, in some embodiments, the climate control alert notification components 220 can include additional components not listed above. In some embodiments, the instruction received from the transport climate control system controller 225 can determine which of the one or more climate control alert notification components 220 are used and the type of local notification provided by the instructed one or more climate control alert notification components 220. In some embodiments, the notification can be tailored to notify random people that are approaching or in close proximity to the unoccupied transport unit and/or to notify service personnel as they are approaching the unoccupied transport unit. In some embodiments, the notification can provide specific information and/or instructions (e.g., via a verbal or digital message, via patterns of blinking and/or steady and/or colored lights, a hazard specific QR code scan, etc.) regarding the particular potential hazard identified.

The transport unit notification system 210 includes a plurality of transport unit alert notification components 250 communicatively connected to a transport unit controller 255. In some embodiments, when there are multiple transport units being monitored by the hazard monitoring system 200, there may be multiple transport unit notification systems as opposed to the single transport unit notification system 210 shown in FIG. 2. The transport unit alert notification components 250 are configured to provide a local notification that there is a potential hazard at the transport unit and/or the transport climate control system upon receiving an instruction from the transport unit controller 255. Any of the transport unit alert notification components 250 can be provided within or on a transport unit (e.g., the climate controlled transport unit 102 of FIG. 1A, the truck 120 of FIG. 1B, the van 130 of FIG. 1C, the intermodal container 170 of FIG. 1D, etc.) and/or provided within or on a vehicle (e.g., the tractor 103 of FIG. 1A, etc.) towing the transport unit. In some embodiments, any of the transport unit alert notification components 250 can be provided within a driver cab of the transport unit (e.g., a driver cab of the tractor 103, a driver cab of the truck 120, a driver cab of the van 130, etc.).

The transport unit alert notification components 250 are configured to provide a local notification and/or a remote notification that there is a potential hazard at the transport unit and/or the transport climate control system upon receiving an instruction from the transport unit controller 255. In some embodiments, the climate control alert notification components 220 can be powered by, for example, a 12 V battery.

The transport unit alert notification components 250 includes: an internal light alarm 250*a* provided within the transport unit and/or within a vehicle towing the transport unit that can, for example, blink/flash or steady one or more lights to indicate the potential hazard inside of the transport unit or a vehicle towing the transport unit; an internal speaker 250*b* provided within the transport unit and/or within a vehicle towing the transport unit that can, for example, generate an alarm sound or verbal message of the potential hazard inside of the transport unit or the vehicle towing the transport unit; a status light panel 250*c* provided on or within the transport unit and/or on or within a vehicle towing the transport unit that can, for example, blink/flash or steady one or more lights to indicate the potential hazard; a haptic feedback device 250*d* provided on or within the transport unit and/or on or within a vehicle towing the transport unit that can, for example, vibrate a driver seat, steering wheel, foot pedal, key fob, etc. to indicate the potential hazard; a heads-up display 250*e* provided on or within the transport unit and/or on or within a vehicle towing the transport unit that can, for example, display text, blink/flash or steady a light, or send an audible sound or verbal message to indicate the potential hazard; a HMI 250*f* provided on or within the transport unit and/or on or within a vehicle towing the transport unit that can, for example, display text, blink/flash or steady a light, or send an audible sound or verbal message to indicate the potential hazard; a mirror display 250*g* provided on or within a mirror of the transport unit and/or on or within a mirror of vehicle towing the transport unit that can, for example, display text, or blink/flash or steady a light to indicate the potential hazard; an external light alarm 250*h* provided on the transport unit and/or on a vehicle towing the transport unit that can, for example, blink/flash or steady one or more status lights to indicate the potential hazard outside of the transport unit or the vehicle towing the transport unit; an external speaker 250*i* provided on the transport unit and/or on a vehicle towing the transport unit that can, for example, generate an alarm sound or verbal message of the potential hazard outside of the transport unit or the vehicle towing the transport unit; and a telematics unit 250*g* provided on or within the transport unit and/or on or within a vehicle towing the transport unit that is configured to store and send an alert notification as a digital message to one or more remote devices away from the transport unit. In some embodiments, the telematics unit 250*g* can, based on the detected potential hazard, send a message (e.g., short message service (SMS) message) to an emergency service (e.g., local police or fire department).

One or more of the transport unit alert notification components 250 can provide different notifications based on the type potential hazard detected. It will be appreciated that in some embodiments, the climate control alert notification components 220 can include some but not all of those listed above. Also, in some embodiments, the climate control alert notification components 220 can include additional components not listed above. In some embodiments, the instruction received from the transport unit controller 255 can determine which of the one or more transport unit alert notification components 250 are used and the type of local notification provided by the instructed one or more transport unit alert notification components 250. In some embodiments, the notification can be tailored to notify random people that are approaching or in close proximity to the unoccupied transport unit and/or to notify service personnel as they are approaching the unoccupied transport unit. Also, in some embodiments, the transport unit alert notification components 250 can adjust or change the notification being provided if the threat of the potential hazard changes.

The transport unit controller 255 is communicatively connected to the transport unit alert notification components 250 and the transport climate control system controller 225. The transport unit controller 255 can also optionally communicate with the wireless device 260 and/or the customer mobile device 265. In some embodiments, the transport unit controller 255 can notify the wireless device 260 and/or the customer mobile device 265 of, for example, a vehicle crash status (e.g., impact, roll-over, etc.), a security related event where a potential hazard (e.g., explosive gas) has to be removed remotely by a manager when a driver issue or theft of the vehicle issue has occurred. Communication between the transport unit controller 255 and either of the transport unit alert notification components 250 and the transport unit controller 255 can be over a wired line (e.g., a controller area network (CAN) bus, a local interconnect network (LIN), etc.) or a wireless communication protocol (e.g., Bluetooth communication protocol, etc.). The transport unit controller 255 can receive a message from the transport climate control system controller 225 when the transport climate control system controller 225 determines that that there is a potential hazard via the hazard monitoring circuit 240. Upon receipt of the message from the transport climate control system controller 225, the transport unit controller 255 can instruct one or more transport unit alert notification components 250 to provide a local notification that there is a potential hazard at the transport unit and/or the transport climate control system. In some embodiments, the transport unit controller 255 can provide, based on the potential hazard, an instruction to one or more components of the transport unit to isolate the source of the potential hazard as a safety measure and to potentially allow other components of the transport unit to operate uninterrupted. For example, gases can be purged to a controlled vent location, high voltage components can be shut off and isolated to batteries while the system is discharged, fire(s) can be extinguished by a fire suppression system, etc.

The proximity detection device 245 is configured to monitor an area surrounding and within the transport unit to determine whether someone is in close proximity to the transport unit. In some embodiments, the proximity detection device 245 can include one or more sensors configured to detect whether someone comes in close proximity to the transport unit. The one or more sensors can include, for example, one or more non-vision based proximity sensors (e.g., a motion sensor) and/or one or more vision based proximity sensors (e.g., a camera based sensor). In particular, the one or more sensors can use visual detection (e.g., camera), sonar, ultrasound, radar, lidar (i.e., light detection and ranging), remote-start key detection, etc. to detect the presence of an obstruction or someone in close proximity to the unoccupied transport unit. The one or more sensors are configured to send one or more proximity signals to the transport climate control system controller 225 and/or the transport unit controller 255 indicating whether someone is in close proximity to the transport unit.

The optional wireless device 260 can communicate with the transport climate control system controller 225 and/or the transport unit controller 255. The optional wireless device 260 can also communicate with an optional customer mobile device 265. In some embodiments, the optional wireless device 260 can be, for example, a permanently mounted display, a custom display device, etc. viewable to the driver of the transport unit. In some embodiments, the optional customer mobile device 265 can be, for example, a mobile phone, a customer hand-held terminal, etc. In some embodiments, the transport climate control system controller 225 can communicate with one or more of the wireless device 260 and/or the customer mobile device 265 to send, for example, warning(s), alarm condition(s), diagnostic information, service and work direction, valve and shut-off location(s) for emergency medical services (EMS), lock-out point(s) and areas where not to cut or disturb high voltage or compressed gas lines for first responders, etc. In some embodiments, the transport unit controller 255 can notify the wireless device 260 and/or the customer mobile device 265 of, for example, a vehicle crash status (e.g., impact, roll-over, etc.), a security related event where a potential hazard (e.g., explosive gas) has to be removed remotely by a manager when a driver issue or theft of the vehicle issue has occurred.

Figure 3A:
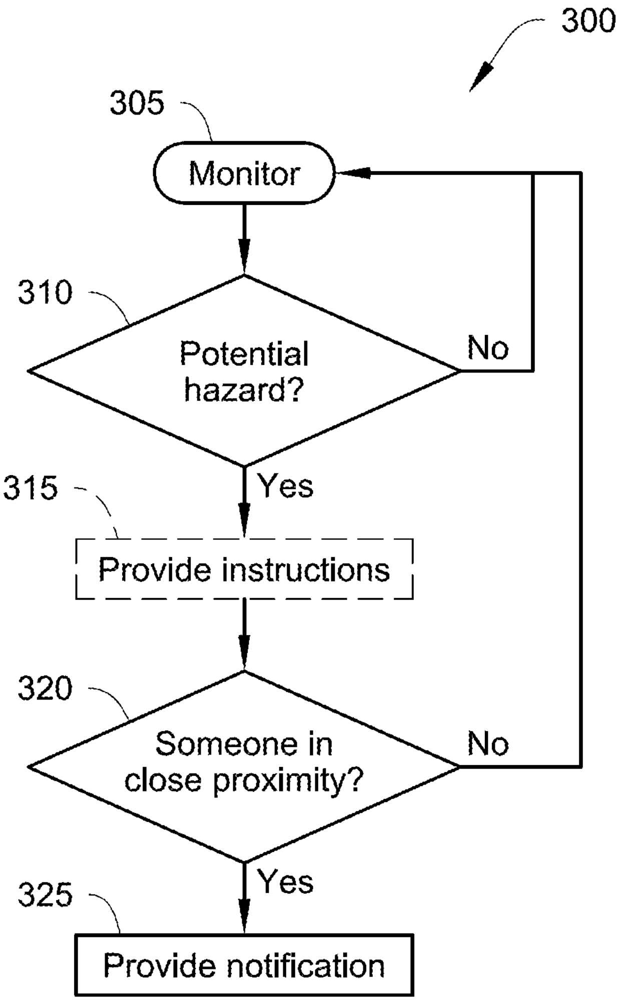
FIG. 3A illustrates a flowchart of a method for monitoring a potential hazard at an unoccupied transport unit and issuing a notification in response to detecting the potential hazard, according to one embodiment.

FIG. 3A illustrates a flowchart of a method 300 for monitoring a potential hazard at an unoccupied transport unit and issuing a notification in response to detecting the potential hazard, according to one embodiment. In some embodiments, the hazard monitoring and alert system 200 can be used to implement the method 300.

The method 300 begins at 305 whereby a hazard monitoring circuit (e.g., the hazard monitoring circuit 240 shown in FIG. 2) monitors the transport climate control system and/or the transport unit (and cargo stored therein) for a potential hazard. At 310, a controller (e.g., the transport climate control system controller 225 shown in FIG. 2) receives one or more monitoring signals from hazard monitoring circuit (e.g., the hazard monitoring circuit 240 shown in FIG. 2) and determines whether there is a potential hazard based on the one or more monitoring signals.

In some embodiments, the hazard monitoring circuit with the controller can monitor and look for different types of electric and non-electric hazards. Examples of potential electric hazards can include: a high voltage DC isolation failure where, for example, a positive or negative terminal (or both) is in physical contact with a chassis that can be detected, for example, based on a resistance measurement or any measurement that detects whether trace amounts of current are detected on a return path or in a path the current is not expected to follow; a generator fault of a generator (e.g., used to power a transport climate control system) such as, for example, a leakage current that can be detected, for example, based on hardware or firmware detection using a dedicated module or control feature, a resistance measurement or any measurement that detects whether trace amounts of current are detected on a return path or in a phat that the current is not expected to follow, etc.; etc.

Examples of potential non-electric hazards can include: a working fluid leak of a working fluid used in a transport climate control system (e.g., a refrigerant including A2L refrigerants, a $CO_2$, nitrogen, cryogen, etc.) that can be detected using, for example, gas monitoring equipment; a fuel cell leak (e.g., a hydrogen leak of a hydrogen fuel cell) that can be detected using, for example, gas monitoring equipment; a fuel tank leak of a potentially flammable fuel (e.g., diesel fuel, etc.) used by, for example, a prime mover to generate mechanical power that can be detected using, for example, gas monitoring equipment; a low tire pressure that can be monitored by, for example, a tire pressure sensor on each of the tires; an overheated hub/axle that can be detected, for example, via one or more temperature sensors, a thermal scan, or one or more vibration sensors (when bearing related); dangerous cargo or a failure in containment of a cargo (e.g., a chemical leak) that can be detected, for example, using one or more thermal scans, temperature sensors, gas monitoring equipment, one or more oxygen sensors (where oxygen has been depleted from a climate controlled space atmosphere, etc.; etc. The hazard monitoring circuit 240 is communicatively connected to the transport climate control system controller 225 and is configured to send one or more monitoring signals to the transport climate control system controller 225 indicating whether a potential hazard has been detected.

In some embodiments, the controller can have access to the cargo being stored in the unoccupied transport unit (e.g., via a bill of lading stored in a memory portion of the controller, a telematics unit, a HMI, etc.). The hazard monitoring circuit can monitor the cargo using one or more thermal scans, temperature sensors, gas monitoring equipment, one or more oxygen sensors (where oxygen has been depleted from a climate controlled space atmosphere, etc. and send a monitoring signal to the controller that can provide information indicating a potential hazard with the cargo (e.g., chemical leak, etc.).

When the controller determines that there is a potential hazard, the method 300 proceeds to 320 or optionally 315. When the controller determines that there is not a potential hazard, the method proceeds back to 305.

At optional 315, the controller can provide instructions to one or more components of a transport climate control system (e.g. the transport climate control systems 100, 124, 135, 172 shown in FIGS. 1A-D) to isolate the source of the potential hazard. For example, gases can be purged to a controlled vent location, high voltage components can be shut off and isolated to batteries while the system is discharged, fire(s) can be extinguished by a fire suppression system, etc. Isolation of the source of the potential hazard can be provided as a safety measure and to potentially allow other components of the transport climate control system to operate uninterrupted. Once the source of the hazard is isolated, the method proceeds to 320. It will be appreciated that while optional 315 occurs prior to 320, in some embodiments, 320 can occur prior to 315 or 315 and 320 can occur simultaneously.

At 320, a proximity detection device (e.g., the proximity detection device 245 shown in FIG. 2) monitors an area surrounding and within the transport unit and sends one or more proximity signals to the controller. The controller receives the one or more proximity signals from the proximity detection device and determines whether someone in close proximity to the transport unit. In some embodiments, the controller determines that someone is in close proximity to the transport unit when the person is within an area surrounding the unoccupied transport unit at which the person can generally observe a local notification provided by the unoccupied transport unit and/or a climate control unit of a transport climate control system. When the controller determines that someone is in close proximity to the transport unit, the method 300 proceeds to 325. When the controller determines no one is in close proximity to the transport unit, the method 300 proceeds back to 305.

At 325, the controller instructs one or more alert notification components (e.g., the transport climate control alert notification components 220, the transport unit alert notification components 250, etc.) to provide a notification that there may be a potential hazard at or near the transport unit. In some embodiments, the controller can choose which of the alert notification components to provide the notification of the potential hazard based on the type of potential hazard that is detected. In some embodiments, the controller can also instruct the alert notification components what type of notification to provide based on the type of potential hazard that is detected. In some embodiments, the controller can instruct the one or more transport climate control alert notification components to provide multiple forms of local and remote notifications (e.g., an audible/sound alert notification, a digital message alert notification, a visual indicator (e.g., light) notification, etc.) The controller can continue to instruct the alert notification component(s) to provide the notification until the potential hazard is no longer hazardous (e.g., the potential hazard has been serviced/fixed, is no longer occurring, etc.). The method 300 then proceeds back to 305.

By providing a local notification only when someone is approaching or in close proximity to the unoccupied transport unit, the power source (e.g., a 12 V battery) powering the alert notification components can be preserved and providing a local notification when no one is in close proximity to the unoccupied transport unit can be prevented.

Figure 3B:
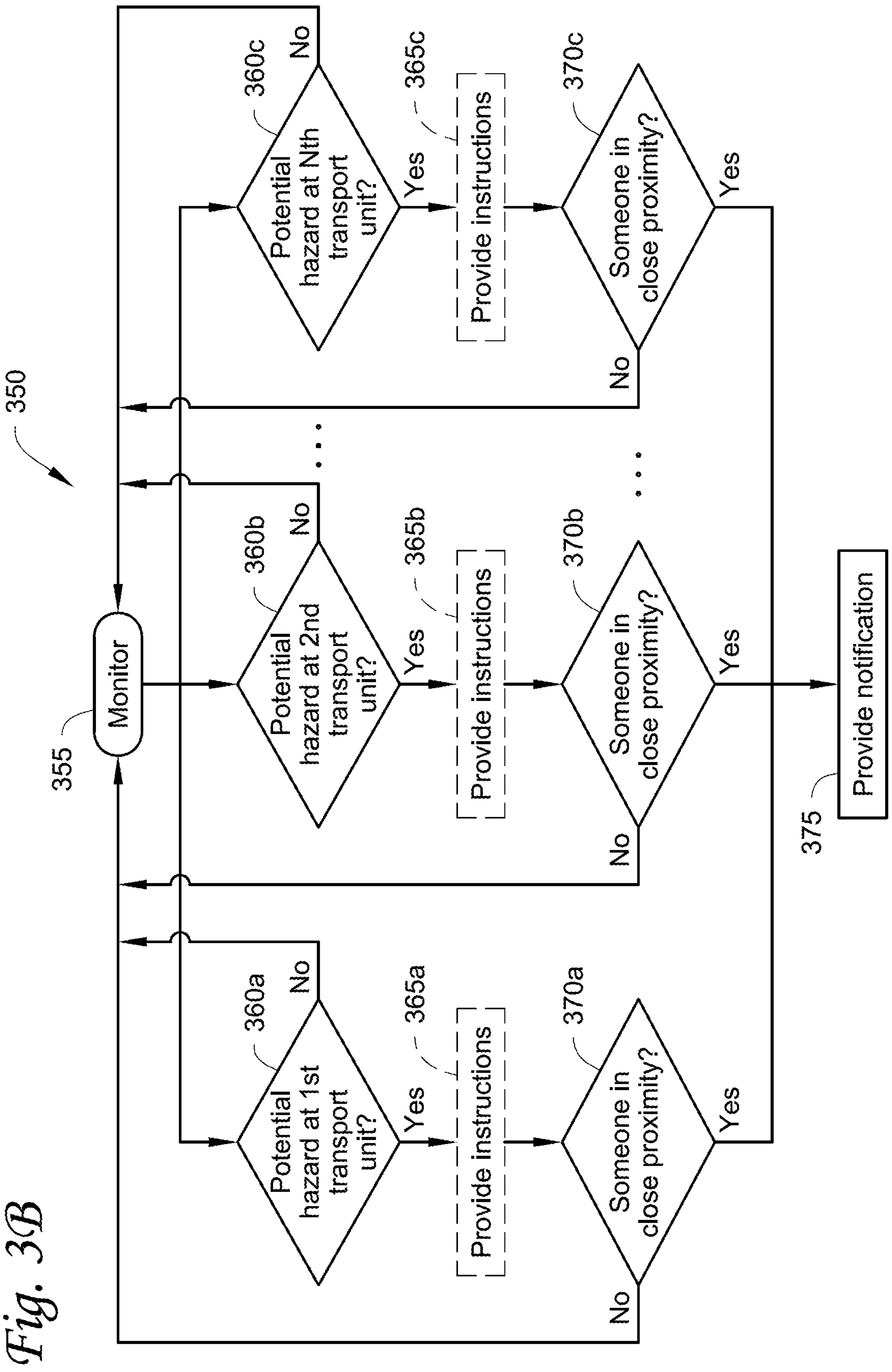
FIG. 3B illustrates a flowchart of a method for monitoring a potential hazard at an unoccupied transport unit and issuing a notification in response to detecting the potential hazard, according to another embodiment.

FIG. 3B illustrates a flowchart of a method 350 for monitoring a potential hazard at multiple unoccupied transport units and issuing a notification in response to detecting the potential hazard, according to one embodiment. The method 350 is similar to the method 300 shown in FIG. 3A except it can be used when there are multiple unoccupied transport units (for example, multiple transport units (e.g., stacked intermodal containers at a fleet yard) that can be in communication with a controller. In some embodiments, the hazard monitoring and alert system 200 can be used to implement the method 350.

The method 350 begins at 355 whereby one or more hazard monitoring circuits (e.g., the hazard monitoring circuit 240 shown in FIG. 2) monitor multiple unoccupied transport climate control systems and/or transport units (and cargo stored therein) for a potential hazard. At 360*a-c*, a controller (e.g., the transport climate control system controller 225 shown in FIG. 2) receives one or more monitoring signals from each of the one or more hazard monitoring circuits (e.g., the hazard monitoring circuit 240 shown in FIG. 2) and determines whether there is a potential hazard at one of multiple unoccupied transport units based on the one or more monitoring signals. Examples of the potential hazards that can be monitored for by the one or more hazard monitoring circuits and determined by the controller include those described above with respect to FIG. 3A. When the controller determines that there is a potential hazard at one of 360*a-c*, the method 350 proceeds to the corresponding 370*a-c* or optionally the corresponding 365*a-c*. When the controller determines that there is not a potential hazard, the method proceeds back to the corresponding 355*a-c*.

At optional 365*a-c*, the controller can provide instructions to one or more components of a transport climate control system (e.g. the transport climate control systems 100, 124, 135, 172 shown in FIGS. 1A-D) associated with the unoccupied transport unit(s) in which the potential hazard is detected to isolate the source of the potential hazard. For example, gases can be purged to a controlled vent location, high voltage components can be shut off and isolated to batteries while the system is discharged, fire(s) can be extinguished by a fire suppression system, etc. Isolation of the source of the potential hazard can be provided as a safety measure and to potentially allow other components of the transport climate control system to operate uninterrupted. Once the source of the hazard is isolated, the method proceeds to the corresponding 370*a-c*. It will be appreciated that while optional 365*a-c* occurs prior to 370*a-c*, in some embodiments, 370*a-c* can occur prior to 365*a-c* or 365*a-c* and 320*a-c* can occur simultaneously.

At 370*a-c*, one or more proximity detection devices (e.g., the proximity detection device 245 shown in FIG. 2) monitor an area surrounding and within the corresponding unoccupied transport unit(s) in which the potential hazard is detected and sends one or more proximity signals to the controller. The controller receives the one or more proximity signals from the one or more proximity detection devices and determines whether someone in close proximity to the corresponding unoccupied transport unit(s). When the controller determines that someone is in close proximity to the corresponding unoccupied transport unit(s), the method 350 proceeds to the corresponding 375*a-c*. When the controller determines no one is in close proximity to the multiple transport units, the method 350 proceeds back to 355.

At 375*a-c*, the controller instructs one or more alert notification components (e.g., the transport climate control alert notification components 220, the transport unit alert notification components 250, etc.) of the corresponding unoccupied transport unit(s) to provide a notification that there may be a potential hazard at or near the corresponding unoccupied transport unit. In some embodiments, the controller can choose which of the alert notification components to provide the notification of the potential hazard based on the type of potential hazard that is detected. In some embodiments, the controller can also instruct the alert notification components what type of notification to provide based on the type of potential hazard that is detected. In some embodiments, the controller can instruct the one or more transport climate control alert notification components to provide multiple forms of local and remote notifications (e.g., an audible/sound alert notification, a digital message alert notification, a visual indicator (e.g., light) notification, etc.) The controller can continue to instruct the alert notification component(s) to provide the notification until the potential hazard is no longer hazardous (e.g., the potential hazard has been serviced/fixed, is no longer occurring, etc.). The method 350 then proceeds back to 355.

By providing a local notification only when someone is approaching or in close proximity to the corresponding unoccupied transport unit in which the potential hazard is detected, the power source (e.g., a 12 V battery) powering the alert notification components can be preserved and providing a local notification when no one is in close proximity to the corresponding unoccupied transport unit can be prevented.

The terminology used in this Specification is intended to describe particular embodiments and is not intended to be limiting. The terms "a," "an," and "the" include the plural forms as well, unless clearly indicated otherwise. The terms "comprises" and/or "comprising," when used in this Specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This Specification and the embodiments described are exemplary only, with the true scope and spirit of the disclosure being indicated by the claims that follow.

What is claimed is:

1. A method for monitoring a potential hazard at an unoccupied transport unit and issuing a notification in response to detecting the potential hazard, the method comprising:

a hazard monitoring circuit monitoring for the potential hazard at the unoccupied transport unit that could be dangerous to someone in close proximity to the unoccupied transport unit, wherein the hazard monitoring circuit includes a hazard detecting sensor configured to monitor the unoccupied transport unit, and wherein the potential hazard is caused by the unoccupied transport unit or an accessory attached to the transport unit;

the hazard monitoring circuit sending a monitoring signal, based on an output of the hazard detecting sensor, to a controller;

the controller determining the potential hazard at the unoccupied transport unit based on the monitoring signal;

upon the controller determining the potential hazard at the unoccupied transport unit, the controller determining whether there is someone is in close proximity to the unoccupied transport unit based on a proximity signal provided by a proximity detection device;

the controller instructing an alert notification component to provide a local notification of the potential hazard at the unoccupied transport unit when the controller determines the potential hazard at the unoccupied transport unit and determines that there is someone is in close proximity to the unoccupied transport unit;

the controller not instructing the alert notification component to provide the local notification of the potential hazard at the unoccupied transport unit when the controller determines that there is no one in close proximity to the unoccupied transport unit;

the alert notification component providing the local notification to anyone in close proximity to the unoccupied transport unit upon receiving an instruction from the controller; and the controller instructing one or more components of the accessory attached to the unoccupied transport unit to isolate a source of the potential hazard.

2. A hazard monitoring and notification system for monitoring a potential hazard at an unoccupied transport unit and issuing a notification in response to detecting the potential hazard, the hazard monitoring and notification system comprising:

a controller;

a hazard monitoring circuit configured to monitor for the potential hazard at the unoccupied transport unit that could be dangerous to someone in close proximity to the unoccupied transport unit, wherein the hazard monitoring circuit includes a hazard detecting sensor configured to monitor the unoccupied transport unit, wherein the potential hazard is caused by the unoccupied transport unit or an accessory attached to the transport unit, and wherein the hazard monitoring circuit is configured to send a monitoring signal to the controller based on an output of the hazard detecting sensor; and an alert notification component configured to provide a local notification of the potential hazard at the unoccupied transport unit upon receiving an instruction from the controller;

wherein the controller is configured to:

determine the potential hazard at the unoccupied transport unit based on the monitoring signal, upon the controller determining the potential hazard at the unoccupied transport unit, determine whether there is someone is in close proximity to the unoccupied transport unit based on a proximity signal provided by a proximity detection device, instruct an alert notification component to provide the local notification of the potential hazard at the unoccupied transport unit when the controller determines the potential hazard at the unoccupied transport unit and determines that there is someone is in close proximity to the unoccupied transport unit, and not instruct the alert notification component to provide the local notification of the potential hazard at the unoccupied transport unit when the controller determines that there is no one in close proximity to the unoccupied transport unit, wherein the controller is configured to instruct one or more components of the accessory attached to the unoccupied transport unit to isolate a source of the potential hazard.

3. A method for monitoring a potential hazard at an unoccupied transport unit and issuing a notification in response to detecting the potential hazard, the method comprising:

a hazard monitoring circuit monitoring for the potential hazard at the unoccupied transport unit that could be dangerous to someone in close proximity to the unoccupied transport unit, wherein the hazard monitoring circuit includes a hazard detecting sensor configured to monitor the unoccupied transport unit, and wherein the potential hazard is caused by the unoccupied transport unit or an accessory attached to the transport unit;

the hazard monitoring circuit sending a monitoring signal, based on an output of the hazard detecting sensor, to a controller;

the controller determining the potential hazard at the unoccupied transport unit based on the monitoring signal;

upon the controller determining the potential hazard at the unoccupied transport unit, the controller determining whether there is someone is in close proximity to the unoccupied transport unit based on a proximity signal provided by a proximity detection device;

the controller instructing an alert notification component to provide a local notification of the potential hazard at the unoccupied transport unit when the controller determines the potential hazard at the unoccupied transport unit and determines that there is someone is in close proximity to the unoccupied transport unit;

the controller not instructing the alert notification component to provide the local notification of the potential hazard at the unoccupied transport unit when the controller determines that there is no one in close proximity to the unoccupied transport unit;

the alert notification component providing the local notification to anyone in close proximity to the unoccupied transport unit upon receiving an instruction from the controller, the controller instructing one or more components of the accessory attached to the unoccupied transport unit to isolate a source of the potential hazard; and wherein the sensor is configured to monitor a potential non-electric hazard including one or more of: a working fluid leak of a working fluid used in a transport climate control system; a fuel cell leak; a fuel tank leak; a low tire pressure of the transport unit; an overheated hub or axle of the transport unit; a failure in containment of a cargo stored in the transport unit.

* * * * *